United States Patent [19]

Jancic et al.

[11] 4,028,909
[45] June 14, 1977

[54] COUPLING, PARTICULARLY FOR USE IN TURBOGENERATORS

[75] Inventors: Gojko Jancic, Nussbaumen; Pierre Meylan, Neuenhof; Alexandre Portmann, Nussbaumen, all of Switzerland

[73] Assignee: BBC Brown Boveri & Company Limited, Baden, Switzerland

[22] Filed: Oct. 8, 1975

[21] Appl. No.: 620,700

[30] Foreign Application Priority Data

Oct. 25, 1974 Switzerland .................. 14298/74

[52] U.S. Cl. .................................. 64/28 R; 285/2
[51] Int. Cl.² ........................................ F16D 8/00
[58] Field of Search ............ 64/28 R, 28 M; 285/2

[56] References Cited

UNITED STATES PATENTS

| 1,870,153 | 8/1932 | Thoman ...................... 64/28 R |
| 1,923,132 | 8/1933 | Witkin ........................ 64/28 R |
| 3,855,818 | 12/1974 | Hochreuter ................... 64/28 R |
| 3,927,537 | 12/1975 | Anderson et al. .............. 64/28 R |

FOREIGN PATENTS OR APPLICATIONS

| 500,901 | 6/1930 | Germany ..................... 64/28 R |
| 842,244 | 7/1960 | United Kingdom ............. 64/28 R |

Primary Examiner—Samuel Scott
Assistant Examiner—Randall Heald
Attorney, Agent, or Firm—Oblon, Fisher, Spivak, McClelland & Maier

[57] ABSTRACT

A coupling for connecting together the end of one shaft to that of another, particularly for use in turbogenerators, includes a large coupling flange fixedly secured to the end of the one shaft and including a countersunk bore portion, a small coupling flange fixedly secured to the end of the other shaft and inserted within the countersunk bore portion of the first shaft, and fastening devices for compressing together the end faces of the shafts and for exerting pressure upon the coupling flanges. A plurality of shear pins are also interposed between the flanges so as to facilitate the transmission of torque from the one shaft to the other during operation, the shafts thereby being rotatably locked together relative to one another.

10 Claims, 7 Drawing Figures

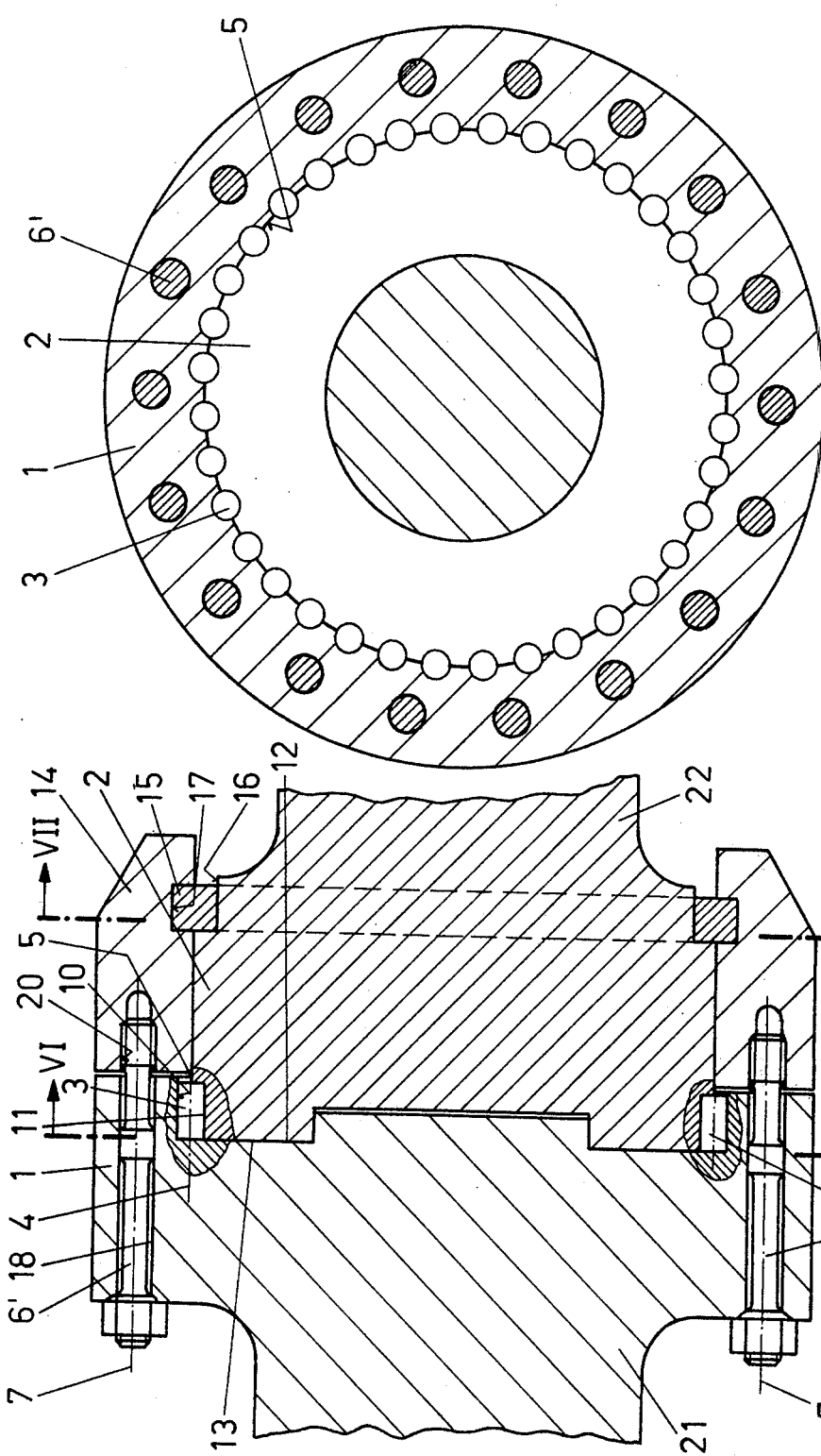

COUPLING, PARTICULARLY FOR USE IN TURBOGENERATORS

BACKGROUND OF THE INVENTION

1. Field of the Invention

The present invention relates generally to coupling devices, and more particularly to a coupling which is particularly adapted for use in turbogenerators.

2. Description of the Prior Art

Couplings for connecting together the ends of two shafts, having coupling flanges fixedly secured thereof, for transmitting large torques therebetween by means of friction generated between the faces of the two coupling flanges produced by axial thrust forces, have long been known. The exterior diameters of the two coupling flanges are generally equal and the axial thrust forces are usually impressed upon the coupling flanges by means of axial screw bolts (see CH-PS 335 573) or shrunk-on sleeve devices (see CH-PS 457 053). These known configurations can thus be used to advantage when the exterior diameters of the coupling flanges are the same and there are no other special limitations imposed upon the system.

In turbogenerator construction, however, there is needed a rigid friction-clutch coupling of the type discussed for transmitting large torques from the turbine shaft to the generator shaft, the coupling flange secured to the turbine shaft being as large as desired, however the flange secured upon the generator shaft has the limitation that its exterior diameter must be smaller than the inside diameter of the turbine end closure, which during assembly must be housed over the generator coupling flange and the coil end thereof. After installation of the end closure, the exterior diameter can then, if deemed expedient, be increased, since the end closure is only rarely disassembled.

The modern development in turbogenerator construction has been in the direction of smaller generator shafts, made possible by improved cooling of rotor windings and the use of high-grade materials, and such shafts must now accommodate even greater torques. As a result, a correspondingly smaller coupling is called for to transmit the torque from the turbine shaft to the generator shaft. The friction which can be developed between the now significantly smaller coupling flanges no longer suffices for transmission of the torques, so that additional means for this purpose are necessary.

SUMMARY OF THE INVENTION

Accordingly, it is an object of the present invention to provide a rigid friction-clutch coupling of the above-mentioned type having coupling flanges of different exterior diameters, the smaller flange being limited so as not to exceed a predetermined exterior diametrical dimension.

Another object of the present invention is to provide a coupling which is particularly capable of transmitting large torques so that is is particularly suited for connecting a turbine shaft to a generator shaft within turbogenerators.

The foregoing and other objects are achieved in accordance with the present invention by the provision of a coupling wherein the free end of the smaller coupling flange is inserted within a countersunk bore provided within the larger flange and which has, as coupling means therefor, a multiplicity of axially-oriented shear elements engaging both coupling flanges, the axes of the shear elements being situated upon a circular locus having a diameter which corresponds, at least approximately, to that of the countersunk bore. A plurality of bolts, the axes of which form an angle, with the coupling axis, which may be within the range of 0° – 35°, are also provided for compressing the flanges together.

BRIEF DESCRIPTION OF THE DRAWINGS

Various other objects, features, and attendant advantages of the present invention will be more fully appreciated as the same becomes better understood from the following detailed description when considered in connection with the accompanying drawings in which like reference characters designate like or corresponding parts throughout the several views, and wherein:

FIG. 5 is a view similar to that of FIG. 1, showing however a third embodiment of a coupling of the present invention, wherein the two coupling flanges are secured together with a sleeve frictionally connected to the smaller flange;

FIG. 6 is a cross-section view of the coupling of FIG. 5 taken along the line VI—VI of FIG. 5.

DETAILED DESCRIPTION OF THE ILLUSTRATED EMBODIMENTS

Figure 2:
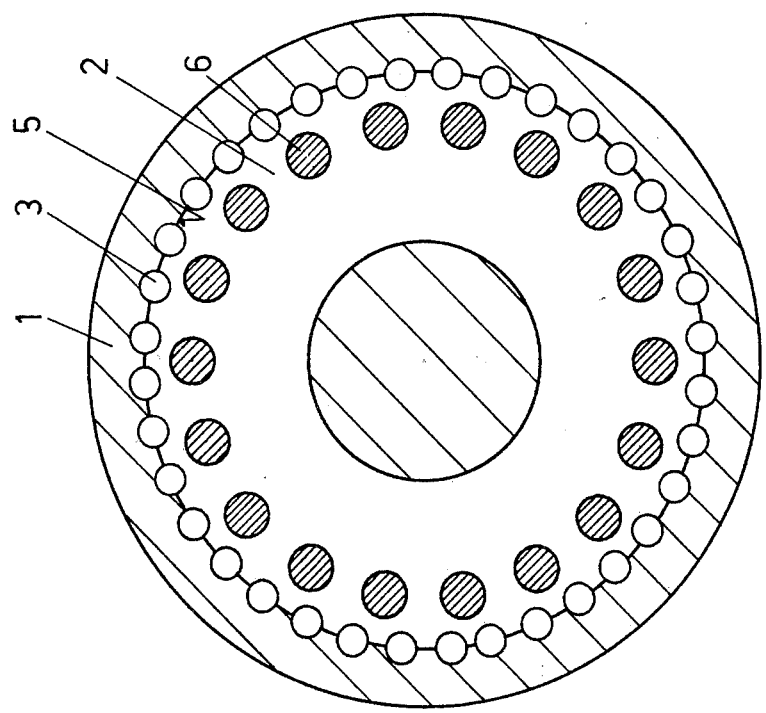
FIG. 2 is a cross-section view of the coupling of FIG. 1 taken along the line II—II of FIG. 1.
Figure 1:
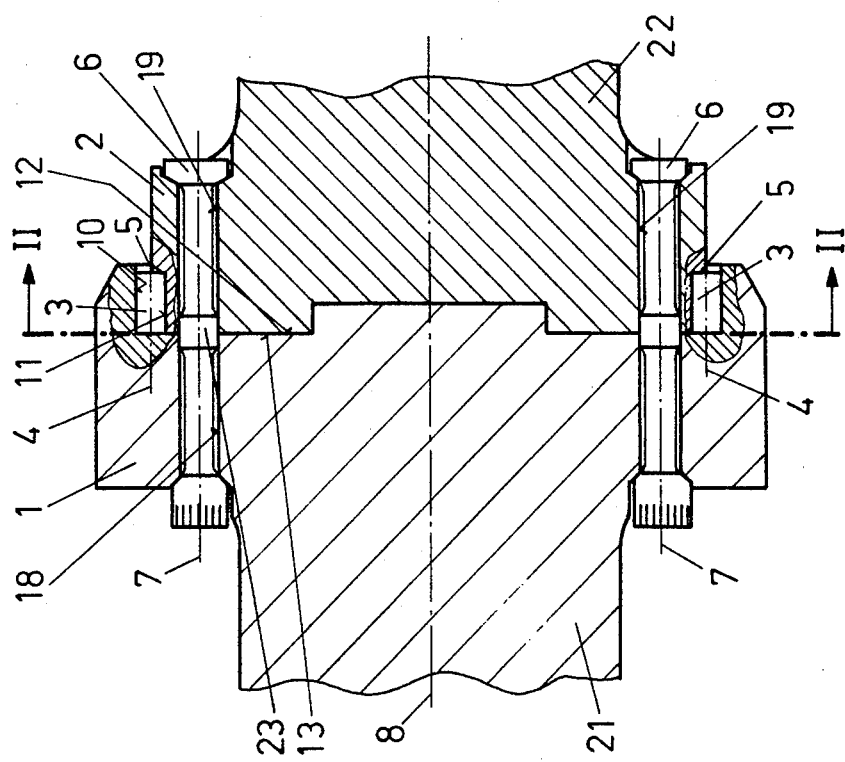
FIG. 1 is a longitudinal cross-section view of a first embodiment of a coupling constructed in accordance with the present invention and showing its cooperative parts, wherein the bolts are disposed parallel to the coupling axis, that is, they define an angle therewith of 0°.

Referring now to the drawings and more particularly to FIGS. 1 and 2 thereof, a first embodiment of a coupling constructed in accordance with the present invention has a large coupling flange 1 integrally formed within the end of a first shaft 21 and provided with an axially extending countersunk bore 5 within its face. A small flange 2 is similarly integrally formed with the end of a second shaft 22 so as to be somewhat smaller in diameter than coupling flange 1 and is adapted to mate snugly within bore 5 of flange 1. A plurality of axially extending pins 3 are seated within suitable recesses defined within the two coupling flanges 1 and 2 whereby pins 3 are interposed therebetween so as to assist in transmitting torque therebetween and serve as shear elements, the purpose of which is to shear or break into two pieces, if the coupling should be subjected to overloading conditions, and thereby preserve intact the coupling flanges 1 and 2.

The material from which the pins 3 are fabricated can be chosen so that the pins will be weaker than the coupling flanges 1 and 2 in order that, when the coupling is in fact overloaded, the pins 3, and not the coupling flanges 1 and 2, will be damaged. The pins 3 are disposed within the recesses or holes, the upper halves 10 of which are defined within the coupling flange 1 while the lower halves 11 are defined within coupling flange 2, the axes 4 of the pins 3 being disposed upon a circular locus the diameter of which is approximately the same as that of the bore 5.

A portion of the transmitted torque occurs as a result of and through the friction generated between the countersunk end surface 12 of bore 5 and the end face 13 of the coupling flange 2 which is in contact therewith, and the friction necessary for such torque transmission is produced and maintained by means of a plurality of axially extending bolts 6 which compress the two coupling flanges 1 and 2 together and thereby serve to generate considerable axial thrust forces upon the flanges, and particularly upon the noted end surfaces thereof. The bolts 6 are disposed within mutually aligned holes or bores 18 and 19 respectively provided within flanges 1 and 2, the axes 7 of the bolts 6 extending parallel to the coupling axis 8 and being disposed upon a circular locus which is coaxial with the coupling flanges 1 and 2. This arrangement requires the radial extent of the coupling flanges 1 and 2 to be sufficiently large in order to house the bolts 6. Interposed between the countersunk end surface 12 of bore 5 within coupling flange 1 and the end face 13 of flange 2 in contact therewith, there may be provided additional axial and/or radial shear elements, such as for example, the enlarged diameter sections 23 of bolts 6.

Figure 4:
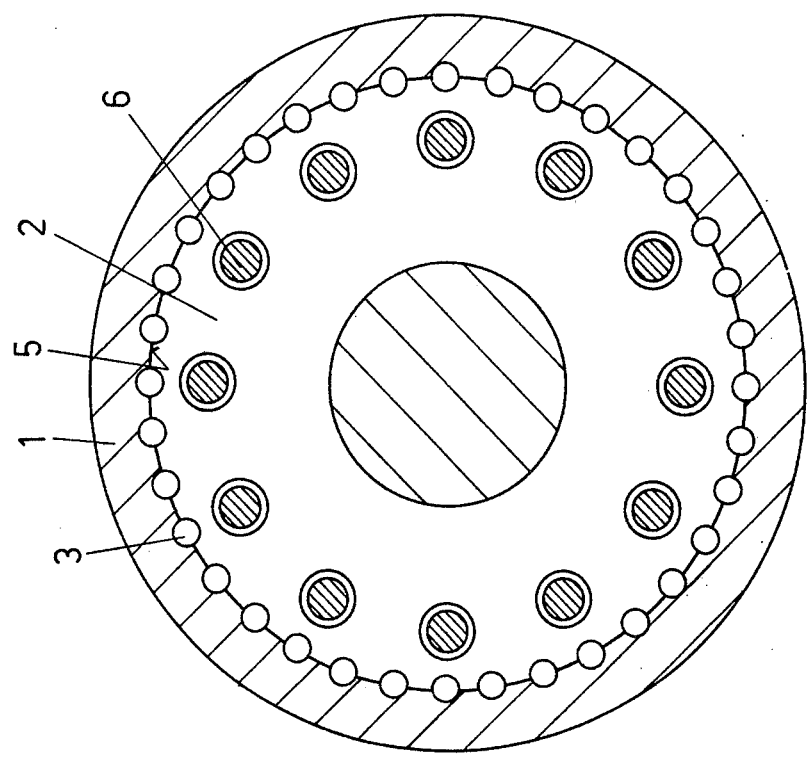
FIG. 4 is a cross-section view of the coupling of FIG. 3 taken along the line IV—IV of FIG. 3.
Figure 3:
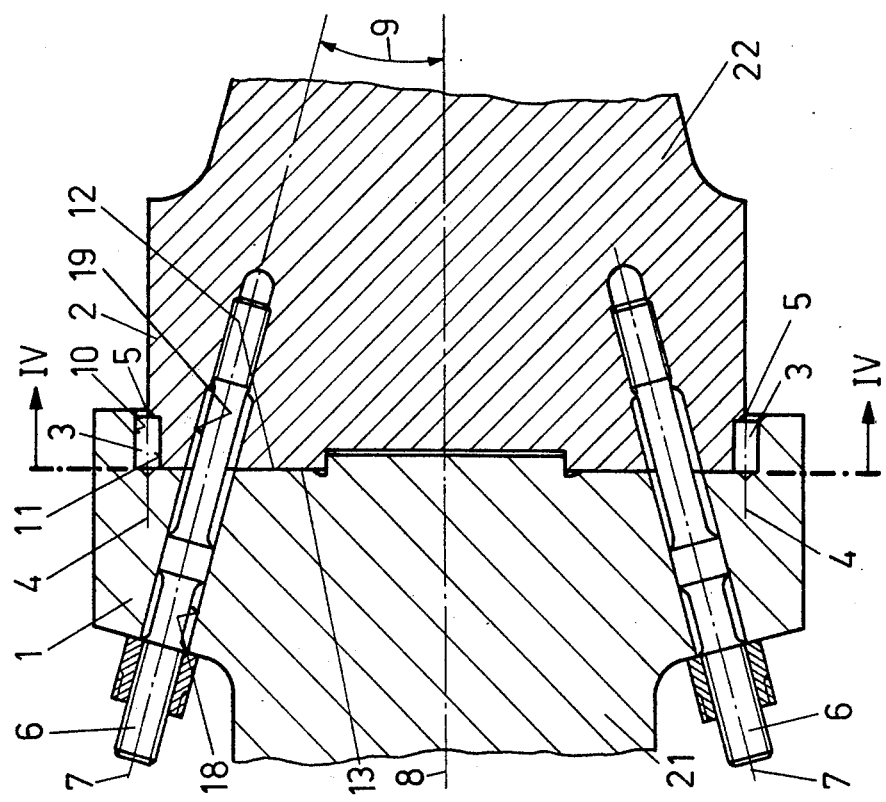
FIG. 3 is a view similar to that of FIG. 1, showing however a second embodiment of a coupling of the present invention wherein the bolts form an acute angle with the coupling axis.

A second embodiment of the coupling of the present invention is shown within FIGS. 3 and 4 and is seen to be essentially identical to the coupling described above, with the difference, however, that the bolts 6 are not disposed parallel to the coupling axis 8, but to the contrary, form an acute angle 9 therewith. This arrangement is preferred when the diameter of the coupling flange 2 differs only slightly from that of the shaft 22 whereby there is insufficient space for housing the axially aligned bolts. The acute angle 9, depending upon the dimensions of the coupling flanges 1 and 2, can be chosen to be within the range of 0° – 35°, it of course being noted and appreciated that the effective thrust forces compressing the two coupling flanges together are the axial components of the forces exerted thereon by means of the bolts 6.

Figure 7:
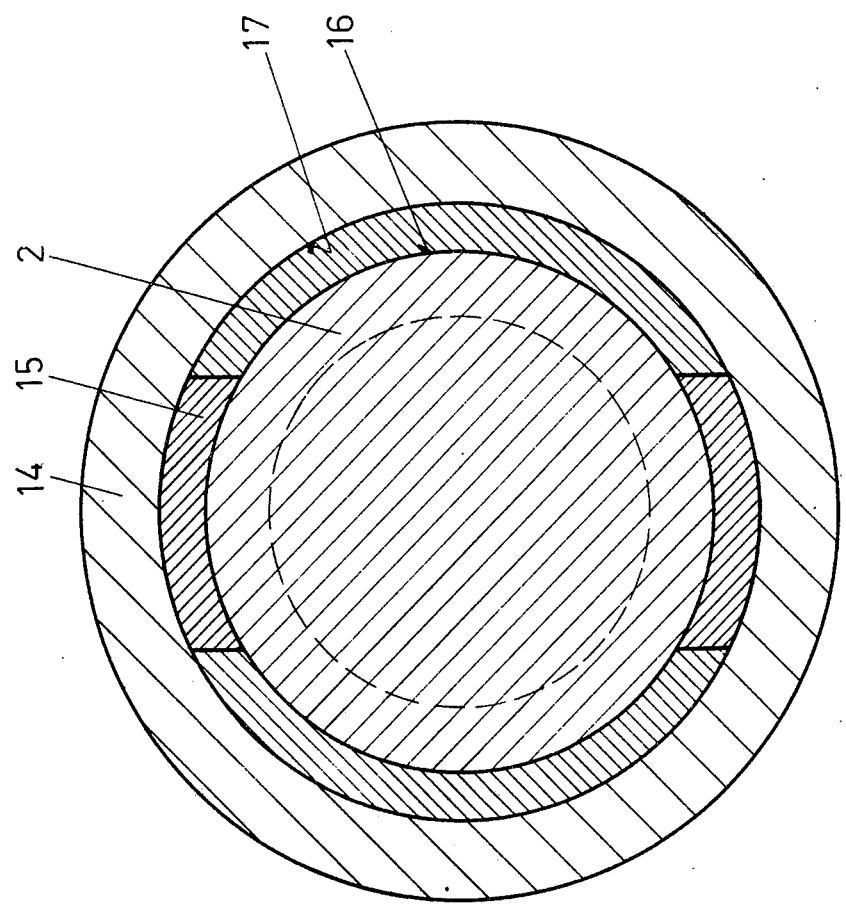
FIG. 7 is a cross-section view of the coupling of FIG. 5 taken along the line VII—VII of FIG. 5.

In accordance with the embodiment of the coupling illustrated within FIGS. 5–7, the coupling flanges 1 and 2 are secured together by means of an annular sleeve 14 which surrounds coupling flange 2 and is frictionally engaged therewith throughout the peripheral extent thereof. The sleeve 14 is compressed downwardly upon coupling flange 2 so that the axial forces exerted upon sleeve 14 by means of the bolts 6 are able to be transmitted, through means of the frictional engagement, to the coupling flange 2, the bolts 6 being disposed within mutually aligned bores or holes 18 and 20 respectively provided within flange 1 and sleeve 14. In order to provide or enhance such frictional connection between sleeve 14 and coupling flange 2, there can be utilized a multisectional ring 15 which is disposed and adapted to be fitted within recesses 16 and 17 respectively formed within flange 2 and sleeve 14.

In order to disassemble the coupling, the compressed fit can be loosened by means of heating, the sleeve 14 moved in the axial direction, and the parts of the ring 15 removed. It should be noted that the connection between the sleeve 14 and the coupling flange 2 can likewise be a welded one which must likewise be loosened for disassembly of the coupling.

Hereinbelow, there is compared various operational characteristics of the coupling device embodiment of the present invention as shown within FIGS. 1 and 2, and a known coupling, of equivalent torque capacity as described within CH-PS 335 573. The outside diameter of the small flange was taken to be 0.950 m in both cases and the permissible shear stress was considered to be 780 kp/cm$^2$.

THE COUPLING OF THE PRESENT INVENTION

| | |
|---|---|
| Number of shear elements | 36 |
| Diameter of shear elements | 4.5 cm |
| Length of shear elements | 10 cm |
| Shear area per element 4.5 × 10 | 45 cm$^2$ |
| Total shear area 45 × 36 | 1620 cm$^2$ |
| Radius of the shear element circle | 0.475 m |
| Transmissible torque 1620 × 780 × 0.475 = | 600 × 10$^3$ kpm |

KNOWN COUPLING

| | |
|---|---|
| Number of shear elements | 12 |
| Outer diameter of shear elements | 15 cm |
| Inner diameter of shear elements | 8.6 cm |
| Shear area per element $\pi/4$ (15$^2$ − 8.6$^2$) | 118.6 cm$^2$ |
| Total shear area 12 × 118.6 | 1423.5 cm$^2$ |
| Radius of the shear element circle | 0.38 m |
| Transmissible torque 1423.5 × 780 × 0.38 = | 422 × 10$^3$ kpm |

The ratio of the calculated torques is $$K = \frac{600 \times 10^3}{422 \times 10^3} = 1.42,$$

and thus, the coupling of the present invention can transmit a torque which is 1.42 times greater than that which the known coupling can transmit.

The essential advantages of the coupling of the present invention are as follows:

a. The shear elements are arranged within the coupling and upon a locus having the greatest possible diameter so that the greatest possible torque capacity can be attained.

b. The number, diameter and length of the shear elements can be varied between relatively wide limits and the torque transmissibility of the coupling correspondingly increased.

c. The turbine shaft, generator shaft, and the small coupling flange can be as small in diameter as desired, and the small coupling flange can even be completely eliminated, the large flange thereupon being directly secured to the generator shaft by means of inclined bolts.

d. The coupling is easily assembled and disassembled and if the configuration with the sleeve is to be assembled, the latter need not be shrunk on at the factory.

e. The coupling is an ideal solution to the special problem of connecting a turbine to a generator, however, the coupling could obviously be utilized for a multitude of other purposes.

f. The construction of the coupling is simple, inexpensive, and such as to render the coupling reliable in operation and able to meet the most exacting manufacturing specifications.

Obviously, many modifications and variations of the present invention are possible in light of the above teachings. It is to be understood therefore that within the scope of the appended claims, the present invention may be practiced otherwise than as specifically described herein.

What is claimed as new and desired to be secured by letters patent of the United States is:

1. A coupling for connecting together the end of one shaft with the end of another shaft, particularly for use in turbogenerators, comprising:
   a large coupling flange fixedly secured to said end of said one shaft;
   a small coupling flange fixedly secured to said end of said other shaft;
   connecting means for connecting said shafts together and exerting thrust forces upon said coupling flanges, and for transmitting the torques developed during operation,
   the free end of said smaller coupling flange being disposed within a bore defined within said larger coupling flange; and
   said connecting means comprises a plurality of shear elements extending, in the axial direction of said coupling, within recesses defined within the outer periphery of said small coupling flange and the inner periphery of said large coupling flange and having their longitudinal axes disposed upon a circular locus having a diameter substantially equal to the diameter of said bore and shear areas extending in the axial direction of said shear elements, and a plurality of shearable bolts connecting said two flanges to one another and having axes which define an angle, with the coupling axis, which may be within the range of 0° – 35°.

2. A coupling as set forth in claim 1, wherein:
   said shear elements are pins inserted within said recesses which are composed of half-portions disposed on the outer periphery of said small coupling flange and mating half-portions disposed on the inner periphery of said large coupling flange.

3. A coupling as set forth in claim 1, wherein:
   the material from which said shear elements are fabricated is weaker than the materials of said coupling flanges,
   whereby, when said coupling is subjected to an overloaded condition, the shear elements, but not the coupling flanges, will be ruptured.

4. A coupling as set forth in claim 1, further comprising:
   additional axial and/or radial shear elements interposed between the end surface of said bore defined within said larger coupling flange and the end face of said smaller coupling flange in contact with said end surface of said large flange.

5. A coupling as set forth in claim 1, wherein:
   said bolts are disposed within mutually aligned bores provided within said two coupling flanges.

6. A coupling for connecting together the end of one shaft with the end of another shaft, particularly for use in turbogenerators, comprising:
   a large coupling flange fixedly secured to said end of said one shaft;
   a small coupling flange fixedly secured to said end of said other shaft;
   connecting means for connecting said shafts together and exerting thrust forces upon said coupling flanges, and for transmitting the torques developed during operation,
   the free end of said smaller coupling flange being disposed within a bore defined within said larger coupling flange; and
   said connecting means comprising a plurality of axially extending shear elements engaging both of said coupling flanges and having their axes disposed upon a circular locus having a diameter at least approximately equal to the diameter of said bore, a plurality of shearable bolts, the axes of which define an angle, with the coupling axis, which may be within the range of 0° – 35°, and an annular sleeve frictionally secured to, and disposed about, said smaller coupling flange.

7. A coupling as set forth in claim 6, wherein:
   said sleeve is secured upon said smaller coupling flange by means of a shrink-fit.

8. A coupling as set forth in claim 7, further comprising:
   a multisection ring interposed between said sleeve and said smaller coupling flange and disposed within circumferential recesses provided within said sleeve and said smaller coupling flange.

9. A coupling as set forth in claim 6 wherein:
   said sleeve is secured upon said smaller coupling flange by means of a welded connection.

10. A coupling as set forth in claim 6, wherein:
    said bolts are disposed within mutually aligned bores provided within said larger coupling flanges and said sleeve,
    whereby said larger coupling flange is rigidly secured to said sleeve.

* * * * *